H. B. MATHEWSON AND K. KNUTSEN.
INTERPUPILARY DISTANCE MEASURING INSTRUMENT.
APPLICATION FILED JUNE 19, 1919.

1,327,163. Patented Jan. 6, 1920.

WITNESS

INVENTORS.
Henry B. Mathewson
Knute Knutsen
BY
Book v Book
ATTORNEYS

UNITED STATES PATENT OFFICE.

HENRY B. MATHEWSON AND KNUTE KNUTSEN, OF SAN FRANCISCO, CALIFORNIA.

INTERPUPILARY-DISTANCE-MEASURING INSTRUMENT.

1,327,163.          Specification of Letters Patent.        Patented Jan. 6, 1920.

Application filed June 19, 1919. Serial No. 305,328.

*To all whom it may concern:*

Be it known that we, HENRY B. MATHEWSON and KNUTE KNUTSEN, citizens of the United States, residing at the city and county of San Francisco and State of California, have invented certain new and useful Improvements in Interpupilary-Distance-Measuring Instruments, of which the following is a specification.

Our invention relates to the class of measuring instruments, and especially to an instrument for measuring the inter-pupilary distance.

Our invention consists essentially in an instrument comprising means for projecting, in parallel planes, two images, and means for indicating the inter-plane space.

The general object of our invention is to provide an instrument for accurately measuring, from a distance, the space between any two points, but, in particular, we contemplate the provision of an instrument, for use by optometrists, for measuring the inter-pupilary space by means which do not require the near approach or proximity of the instrument to the eyes thereby avoiding the disadvantages of involuntary convergence of the eye-balls, or facial or occular intolerance of the near-by instrument.

To these ends we provide an instrument consisting of a pair of projectors adapted to throw a pair of images, preferably in the form of vertical lines contrasting with the screen on which they fall, and a graduated bar upon which said projectors are accurately mounted to throw their images in parallel planes and are relatively adjustable to vary the distance between them, whereby when the images are, by the adjustment of the projectors made to fall upon the points to be measured, as, for example the pupils of the eyes, the space between the projected planes can be read upon the graduated bar, thus giving the inter-pupilary distance.

In the accompanying drawings, we have illustrated one form of our instrument, but it is to be understood that the projecting means may be varied in accordance with known methods of projection, either opaque or transparent, or direct or reflected projection; and the character and form of the images projected may be varied either in shape or contrasting color, luminous or shadow, and the details of mounting and adjustment of the projectors on the graduated bar may also be varied; and all these changes are intended to fall within the scope of and to be covered by our claims, except wherein specific construction is claimed.

Figure 1:
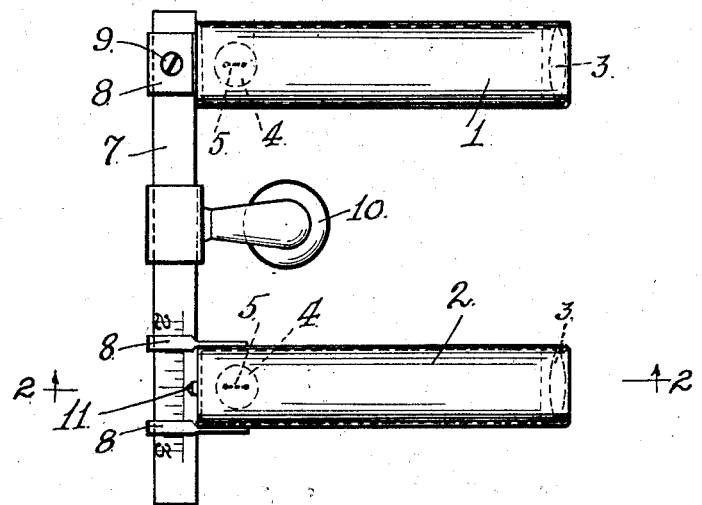
Figure 1 is a plan view of our measuring-instrument.
Figure 2:
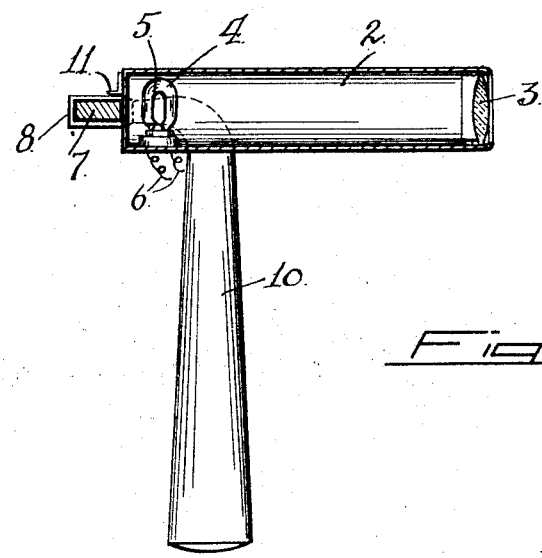
Fig. 2 is a section on the line 2—2 of Fig. 1.

1 and 2 are tubes, each fitted with an objective or lens 3, at its forward end. Within each tube back of the lens is an electric lamp 4, the filament 5 of which is vertical. 6 is the electric circuit to the lamps. 7 is a graduated bar. Upon the bar the tubes 1 and 2 are mounted in suitable manner as by the stirrups 8. The tubes are parallel and the mounting must be firm enough to so hold them. The stirrups 8 have a sliding fit on the bar 7, so that the tubes are relatively adjustable to and from each other. In practice one of the tubes, here shown as 1, has a provision for fixing it, as by means of the set-screw 9. The other tube 2 is freely adjustable along the bar, the idea being to initially adjust and set tube 1 with relation to the graduations and then perform the measuring by the adjustment of tube 2. 10 is a handle fitted to the bar 7, and 11 is an indicating pointer on the tube 2, which plays along the scale of the bar 7.

The use of the instrument is as follows:

The operator, sitting in front of his patient directs the latter to look with normal distant vision at any point selected. The instrument is held by the operator in any convenient position, and the electric current is turned into the lamps 4. The images of the filaments 5 of the lamps are thereby projected in parallel planes and fall in vertical lines of light upon the face of the patient. Then by relatively adjusting the tubes 1 and 2, these light images are made to accurately intersect the pupils of the patient's eyes. When this is done, the distance between the tubes and the planes of projected light may be read upon the graduated bar 7.

Thus the inter-pupilary distance is accurately determined without subjecting the patient to the intolerance of physical contact or of the near approach of any instrument which might cause his eye balls to change position in their sockets. As before stated the projected images need only be in visible contrast to the surface on which they fall, but in practice we find that the light images projected from the illuminated filaments of the lamps are very satisfactory in this regard, being distinct vertical lines, easily seen but not of sufficient strength to annoy the patient.

We claim:

1. A measuring-instrument comprising a pair of projectors for throwing two images in parallel planes; and a graduated bar upon which said projectors are mounted whereby the inter-plane space is indicated.

2. A measuring-instrument comprising a pair of projectors for throwing two images in parallel planes; and a graduated bar upon which said projectors are relatively adjustably mounted, whereby the inter-plane space may be varied and is indicated.

3. A measuring-instrument comprising a pair of projectors; associated objects, images of which said projectors are adapted to throw in parallel planes; and a graduated bar upon which said projectors are mounted whereby the inter-plane space is indicated.

4. A measuring-instrument comprising a pair of projectors; associated objects, images of which said projectors are adapted to throw in parallel planes; and a graduated bar upon which said projectors are relatively adjustably mounted, whereby the inter-plane space may be varied and is indicated.

5. A measuring-instrument comprising a pair of tubes each provided with a projecting lens, an illuminant and an object, the images from which objects are projected in parallel planes; a graduated bar; and means for relatively adjustably mounting said tubes upon said bar whereby the inter-plane space may be varied and is indicated.

6. A measuring-instrument comprising a pair of tubes each provided with a projecting lens, and with an electric incandescent lamp the image of the filament of which is adapted to be projected; and a graduated bar upon which said tubes are relatively adjustably mounted and so disposed as to project said images in parallel planes whereby the inter-plane space may be varied and read upon the graduated bar.

In testimony whereof we have signed our names to this specification in the presence of two subscribing witnesses.

HENRY B. MATHEWSON.
KNUTE KNUTSEN.

Witnesses:
  WM. F. BOOTH,
  D. B. RICHARDS.